Jan. 17, 1950     C. B. VICKERS     2,495,151
HYDRAULIC SYSTEM
Filed Aug. 10, 1943
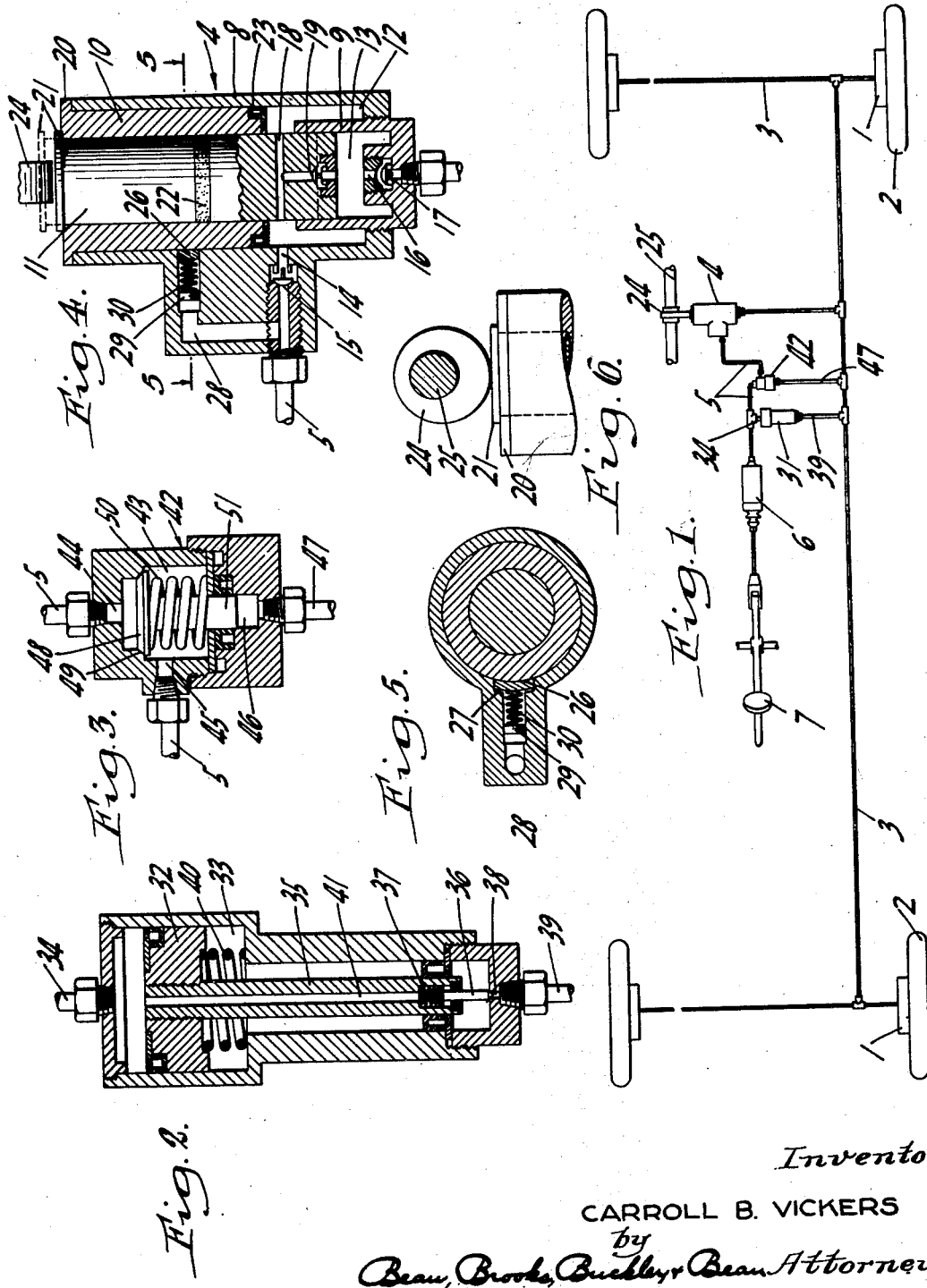
Inventor,
CARROLL B. VICKERS Patented Jan. 17, 1950

2,495,151

UNITED STATES PATENT OFFICE 2,495,151

HYDRAULIC SYSTEM

Carroll B. Vickers, Buffalo, N. Y., assignor to Mildred V. Somervell

Application August 10, 1943, Serial No. 498,067

4 Claims. (Cl. 60—52)

This invention relates to a hydraulic system and particularly to one especially adapted for use in a motor vehicle for applying the brakes thereof. The primary object of the invention is to provide a self-energizing system which is practical and suitably adapted for vehicular use.

The invention further has for its object to provide a hydraulic system wherein the braking or work performing pressure is divided into multiple stages for effecting a quick initial pressure buildup supplemented by a high pressure functioning of the system.

More particularly the invention relates to a hydraulic brake system for motor vehicles in which the brakes are initially and quickly applied to a degree preferably short of that necessary to cause the wheels to slide on a slippery surface, and thereafter, and following a deceleration of the vehicle, effecting a firmer braking action for bringing the vehicle safely to a position of rest.

Another object of the invention is to provide a braking system for heavy duty trucks and vehicles which is efficient in operation and enables the driver of the vehicle to maintain safe control of the vehicle on the roadway.

A still further object of the invention is to provide a hydraulic system which is sensitive to the touch or feel of the operator, and further to provide a system with a safety factor against overload.

In the drawing which discloses a single embodiment of the inventive principles involved, Fig. 1 is a diagrammatic showing of the invention as applied to the brake system of a motor vehicle;

Fig. 2 is a detailed sectional view through the brake releasing unit;

Fig. 3 is a similar view through the control or "feel" unit;

Fig. 4 is a like view through the pumping unit;

Fig. 5 is a transverse sectional view about on line 5—5 of Fig. 4; and

Fig. 6 is a fragmentary showing of the normal relationship of the pump and its drive.

Referring more particularly to the accompanying drawing, the numeral 1 designates the brakes for the individual wheels 2 of a motor vehicle, the brake motors being joined by conduit 3 to a self-energizing pumping means 4 connected in turn by a conduit 5 to a master cylinder 6 where the braking liquid of the hydraulic system is subjected initially to pressure by the pedal 7.

The pumping means comprises a low pressure pump 8, which is calibrated or designed to exert a pressure in the brake or work line 3 short of that required to "lock" the wheels or which might cause them to slide upon a wet or slippery surface, and a relatively high pressure pump 9 of lesser capacity for entrapping the body of liquid in the brake line in advance thereof and accelerating the pressure buildup on such entrapped body for effectively applying the brakes. For compactness and efficiency these two pumps are depicted in a single unit with the piston 10 of the low pressure pump being in the form of a sleeve encircling and sliding upon the relatively longer piston 11 of the high pressure pump. The chamber 12 of the low pressure pump has the smaller diametered chamber 13 of the high pressure pump threaded or otherwise projected upwardly through the bottom of the larger and encircling chamber 12. The chamber 12 has an inlet port 14 to which pipe 5 leads and which is provided with a check valve 15. The chamber 13 has an outlet port 16 provided with a check valve 17. The piston 11 is provided with a transverse passage 18 which establishes communication between the two chambers and is controlled by a check valve 19 for serving both as an outlet valve for the low pressure pump and an inlet valve for the high pressure pump. The piston 10 has a shoulder 20 overhanging the open end of the chamber 12 to prevent it from closing over the inlet port 14 or the passage 18, while a shoulder 21 on the outer end of the piston 11 overhangs the encircling piston 10 and constitutes a driving connection therebetween. Suitable packing 22 and 23 seals the sliding fit of the two pistons within each other and within the low pressure chamber.

For driving the pump unit one or more cams 24 may be fixed on the vehicle drive shaft 25 to rotate therewith. The pistons normally remain outside the path of the cam, as depicted in Fig. 6, but when the pedal 7 is depressed, the resultant pressure on the liquid in the line 5 and in the chambers 12 and 13 (after the initial slack in the brakes has been absorbed) will lift the pistons into the path of the cam for reciprocation thereby. Consequently the pressure in the brake line 3 will build up rapidly by reason of the large displacement under the joint action of the two pistons.

To relieve the drive of too great a load after the brakes become effective to initially retard the motion of the vehicle, the piston 10, having a relatively larger displacement, is withdrawn from functioning and this is accomplished herein by a pressure responsive means in the form of a friction stop or shoe 26 for engaging the periphery of the low pressure piston to hold it down against following the receding upwardly moving cam. This shoe may be slidably mounted in a pocket 27 formed in the side wall of chamber 12, the pocket being in communication with the pressure or hydraulic line 5 through a branch passage 28. A piston 29 operates in this passage in response to the fluid pressure therein and this pressure is transmitted by the piston through an interposed cushioning spring 30 to the friction shoe 26. With the low pressure piston thus held down or inoperative, the cam will continue functioning solely on the high pressure piston for subjecting the braking fluid to a higher pressure for arresting vehicular motion. Upon the release of the pedal 7 the pressure in the brake line 3 will be relieved by a releasing unit generally designated by the numeral 31.

The releasing unit comprises a differential piston having a larger head 32 operating in a chamber 33 which is in communication with the pressure line 5 through a branch passage 34. The head 32 has a tubular stem 35 carrying a valve 36 on its free end, the valve being slidably mounted and resiliently backed by a coil spring 37 for engaging a seat through which a port 38 opens into a passage 39 leading to the brake line. A heavier spring 40 normally lifts the head 32 so as to relieve the valve 36 of such spring pressure which would maintain the brakes operative. However, the initial pressure buildup in the master cylinder will act downwardly upon the head 32 and thereby compress the spring 37 for holding the valve 36 seated during the braking operation. This valve serves in a dual capacity in that should the braking pressure in the line 3 become excessive such valve will open against its spring 37 as a safety valve. When the foot pressure is entirely removed, the higher pressure in the brake line will unseat the valve as the spring 40 relaxes the spring 37. Therefore, the fluid from the brake line will shunt the pumping unit and return to the master cylinder through the stem passage 41. The moving parts of the releasing unit will be sealed by suitable packing, such as that shown.

To render the braking operation more sensitive to the touch of the motorist, a control unit 42 is interposed between the pressure line 5 and the brake line 3 beyond the releasing unit. This control unit comprises a chamber 43 having an inlet port 44 connected to the master cylinder and an outlet port 45 leading to the pumping unit. A reactance chamber 46, constituting a reduced extension of the chamber 43, has communication through passage 47 with the brake line 3. A differential valve has a large head 48, normally engaging a seat 49 between the inlet and outlet ports under the urge of a spring 50, and a smaller head 51 having a fluid sealed fit in the reactance chamber 46. The foot pressure acting upon the larger surface of head 48 will be more or less counteracted by the system pressure from line 3 and thereby enable the operator to "feel" the action of the system.

The operation of the system may be briefly summarized in the following manner:

The manual depression of the pedal 7 operates the master cylinder or pressure generator to subject the entire system to a predetermined pressure buildup beyond which the pressure will react against the pistons 10 and 11 and move them into the path of the rotating cam 24. Thus, when pedal 7 is depressed, fluid is displaced in the fluid transmission line to the brake cylinders from the master cylinder 6. The fluid pressure is initially transmitted through conduit 5, pump passage 14 and check valve 15, chamber 12, passage 18 and check valve 19, chamber 13, port 16, and check valve 17 to line 3 and wheel cylinders 1. When the pressure in this conduit system builds up to a predetermined value, which results after mechanical slack has been absorbed to initially set the brakes operated by the wheel cylinders, the pistons 10 and 11 are lifted into the path of cam 24 and the pump actuated to multiply the pressure from the master cylinder in the wheel brake cylinders. Some of the displaced fluid from the master cylinder actuates the piston 32 of the relief unit 31, this initially developed master cylinder pressure being also sufficient to open the control valve 49 as well as check valves 15 and 19, whereby valve 36 is held closely upon its seat to close communication between the master cylinder and brake cylinders through passage 41 so that initial brake applying pressure is supplied to the brake cylinders exclusively through the valve unit 42 and pump unit 4 as above described. The initial foot pressure will act downwardly upon the release valve head 32 to cause the valve 36 to more firmly seat over the port 38 for braking operation. This port is normally closed by the valve 36 functioning as a check valve. Therefore when the master cylinder is operated, the liquid will be prevented from flowing through the release unit directly into the brake line. While the cam may have an active face of sufficient breadth to contact both pistons, the overhanging shoulder 21 makes this unnecessary. As they are lifted into the path of the rotating cam, both pistons will be reciprocated to provide a relatively large fluid displacement for initially applying the brakes of the vehicle. The larger fluid displacement is especially desirable in vehicle brake systems having large brake cylinders or a number of brake cylinders in excess to those of the usual pleasure vehicle.

After the pressure buildup in the brake system becomes predetermined, the pressure in the pressure line 5 will effect operation of the friction shoe 26 to thereby hold the larger and low pressure piston 10 downwardly against operation by the cam driven piston 11. This predetermined pressure, as above set forth, is preferably insufficient to slide the wheels. Therefore, while the brakes are initially applied rapidly, the wheels will be prevented from losing their traction hold on the road bed. With this initial braking of the vehicle, the motion of the vehicle will be retarded and the rotation of the cam correspondingly decelerated. However, with the brakes applied effectively to this initial extent, the further sole action of the piston 11 will secure the desired braking operation for bringing the vehicle safely to rest.

The application of the brake is readily determined by the control unit 42 since the pressure buildup in the brake line 3 will manifest itself in the reactance chamber 46 in urging the valve head 48 toward its seat against the foot pressure transmitted through port 44.

The effectiveness of the hydraulic system will depend upon the number of revolutions of the wheels required to supply fluid to the brakes. It is desirable to subject the liquid in the brake line to the desired pressure in the shortest possible distance of vehicle travel consistent with such other requirements as may be essential or vital for the safe operation of the vehicle. The control of the braking pressure is always in the hands of the operator for, by varying his foot pressure on the brake pedal, the cam actuated pumping unit may be operated one or more full strokes, or possibly only a part of a single stroke or, under still other conditions, the operation of the pumping unit by the cam may be dispensed with entirely because the foot pressure up to a predetermined degree is transmitted directly to the brakes without the intervention of the pumping unit. As this foot pressure is increased above such predetermined degree, the pistons of the pumping unit will be lifted more or less fully into the path of the cam. For certain operative purposes the pistons may be lifted only a very short distance so that the cam on its downward movement will impart a correspondingly short stroke to the pistons, while in an emergency a heavier foot pressure will obviously lift the pistons a greater distance for the impartation of a longer pumping stroke. While the cam may be operating at a high R. P. M., it is quite obvious that the brakes may be effectively set by one or two strokes, or even a part of a stroke, when the assistance of the pumping unit is required.

When the piston has been depressed fully by the cam and the braking pressure created thereby has reached the desired degree, the piston or pistons will then remain in their down position while the operator holds the pedal depressed in its then position because while the foot pressure was heretofore sufficient to lift the piston into the path of the cam, it will be observed that such downward stroke of the piston will have developed a higher pressure in the brake line, which higher pressure will have reacted on the control unit 42 to cause the valve head 48 to interrupt the line of communication between the master cylinder and the pumping unit. Therefore, to again bring the pumping unit into operation, an additional foot pressure will be required sufficient to counteract the pressure which has caused the valve head 48 to seat.

Upon the release of the pedal 7 the pressure in the master cylinder will be relieved and thereby allow the spring 40 to relieve the spring pressure 37 sufficiently to enable the higher pressure in the brake line, which acts against the relatively small surface area of the valve 36, to unseat the latter, whereupon the excess liquid will return to the master cylinder through the stem passage 41. The relief of the foot pressure may be complete or partial; if partial, it is obvious that the release unit will function to only release a predetermined amount of fluid from the brake line through the check valve 36. The volume of fluid released will depend upon the pressure differential acting on the larger head 32.

The displacement of the pumping unit will be calibrated for the greatest efficiency and therefore the comparative scale of illustration of the several parts of the system used herein is not intended by way of limitation. Furthermore while the pumping unit has been shown as comprising plural high and low pressure sections it may comprise just a single piston. Such a pump would be satisfactory for a lighter type of motor vehicle, or where small piston displacement is ample.

While the invention has been described in great detail, it is not intended thereby to restrict the scope of the invention beyond that set forth in the appended claims, it being obvious that the inventive principles involved may be incorporated in other physical embodiments and for other usages than that depicted.

I claim:

1. A hydraulic system comprising a hydraulic work performing unit, a manual pressure generator in fluid communication therewith, a pump unit interposed between the generator and the work performing unit and comprising a piston operating in a chamber, a rotatable cam for operating the pump and being normally spaced therefrom, the piston adapted to be lifted by the fluid pressure from the generator into the path of the cam for being actuated thereby to subject the work performing unit to a higher pressure, and a control unit interposed between the pump unit and the generator comprising a differential valve having a relatively large head subject to the pressure of the generator and a relatively small head subject to the pressure from the pump unit, the large head when closed acting to interrupt the flow of liquid from the generator to the pump unit.

2. In a hydraulic brake system, a fluid pressure generator unit, a pump actuator, a pump normally disconnected from said actuator, a fluid pressure supply line between the generator unit and said pump, said pump having a pressure producing element and provided with a fluid transmitting passage for communication at its inlet with said supply line, wheel brake cylinders, a brake line connected between the pump passage outlet and said wheel cylinders, a normally closed control valve in said supply line between the generator unit and said pump adapted to open and transmit generated fluid pressure from said generator unit to said pump, a brake release line connected between said supply line and said brake line, said brake release line being connected to the supply line between said generator unit and the inlet to said control valve, a release valve assembly in said brake release line having control means operably connected to said supply line, generation of fluid pressure in said supply line closing said release valve and opening said control valve, and means responsive to generated pressure in said supply line for establishing an operative connection between said actuator and said pump, said release valve establishing fluid return communication between said brake line and the supply line when said generated fluid pressure decreases below a predetermined amount.

3. In the hydraulic brake system defined in claim 2, said release valve assembly comprising a tubular piston containing a fluid passage serving as part of said brake release line for return of fluid from the wheel cylinders to said generator unit, and said piston carrying the release valve and being exposed to generated fluid pressure from said supply line.

4. In the hydraulic brake system defined in claim 3, said release valve being yieldably urged toward closed position by a spring reacting between it and said piston, and being opened by brake line pressure when said generated fluid pressure is reduced below a predetermined amount.

CARROLL B. VICKERS.

REFERENCES CITED

The following references are of record in the file of this patent:

UNITED STATES PATENTS

| Number | Name | Date |
|---|---|---|
| 530,872 | Wilson | Dec. 11, 1894 |
| 833,457 | Hammond | Oct. 16, 1906 |
| 1,263,401 | Fraser | Apr. 23, 1918 |
| 1,794,356 | Baker | Mar. 3, 1931 |
| 1,829,451 | McNab | Oct. 27, 1931 |
| 2,252,482 | Gates | Aug. 12, 1941 |
| 2,260,490 | Stelzer | Oct. 28, 1941 |
| 2,263,560 | Albertson | Dec. 2, 1941 |
| 2,270,586 | Jahant | Jan. 20, 1942 |
| 2,328,132 | Ernst | Aug. 31, 1943 |
| 2,332,340 | Price | Oct. 19, 1943 |
| 2,345,634 | Schnell | Apr. 4, 1944 |
| 2,349,310 | Schnell | May 23, 1944 |
| 2,396,897 | Stelzer | Mar. 19, 1946 |